T. SOPWITH.
DEVICE FOR THE ATTACHMENT OF CABLES, WIRES, AND THE LIKE UPON AIRCRAFT.
APPLICATION FILED JULY 7, 1917.
1,299,049.  Patented Apr. 1, 1919.
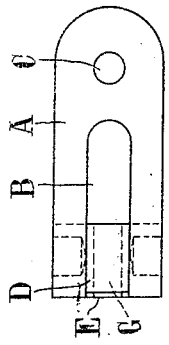
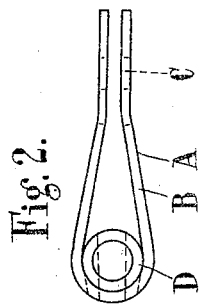
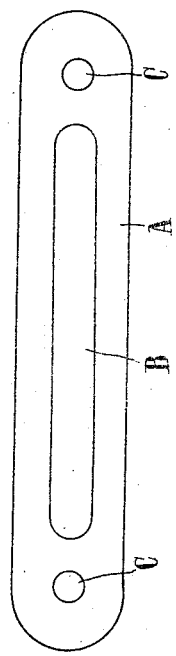
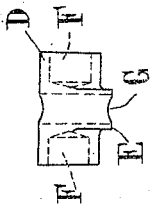
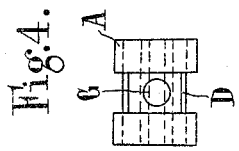
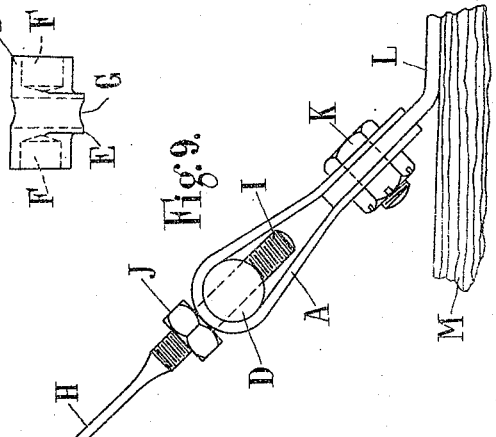
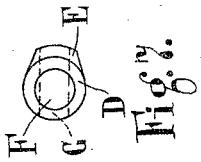
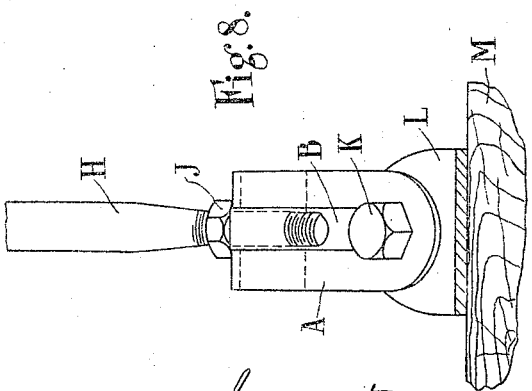

UNITED STATES PATENT OFFICE.

THOMAS SOPWITH, OF KINGSTON-ON-THAMES, ENGLAND, ASSIGNOR TO THE SOPWITH AVIATION COMPANY LIMITED, OF KINGSTON-ON-THAMES, ENGLAND, A CORPORATION OF GREAT BRITAIN.

DEVICE FOR THE ATTACHMENT OF CABLES, WIRES, AND THE LIKE UPON AIRCRAFT.

1,299,049. Specification of Letters Patent. Patented Apr. 1, 1919.

Application filed July 7, 1917. Serial No. 179,207.

*To all whom it may concern:*

Be it known that I, THOMAS SOPWITH, a subject of the King of Great Britain and Ireland, and a resident of Kingston-on-Thames, England, have invented an Improved Device for the Attachment of Cables, Wires, and the like upon Aircraft, of which the following is the specification.

This invention relates to an improved device for the attachment of cables, wires and the like upon aircraft, and especially for the securing of stay wires or cables and the like upon aeroplanes.

According to my invention I form the securing or attaching device as follows:—An elongated strip of sheet metal, conveniently steel, has a considerable portion of the interior cut out of it, leaving a hole or slot through same with the metal intact around it. The hole or slot thus formed may conveniently be of elongated oval or like form. A hole is drilled through each of the ends of this strip of metal, the two ends of the said strip are then folded together and the securing bolt or screw is passed through the said two holes. This securing bolt or screw holds the device to the frame or the like of the aircraft. I provide a swiveling or trunnion pin which is formed with shoulders at its center, which shoulders abut against the inner edges of the said elongated hole, and to the boss thus formed on the center of the trunnion pin is secured in any suitable manner the wire, cable, or stay.

This device provides an extremely convenient and simple method and means of securing the ends of wires, cables, or stays upon aircraft, the anchoring portion of which forming a swivel or trunnion, prevents the shearing or bending effect on the end of the wire, cable, or stay, and obviates breakage of same.

And in order that this invention may be completely understood reference should be made to the accompanying sheet of drawings which illustrate the preferred mode of carrying the invention into operation.

Figure 1 is a plan of the sheet or plate metal portion as stamped or perforated before being bent up.

Fig. 2 is an edge view of a similar plate metal portion with the trunnion pin in position.

Fig. 3 is a plan view of Fig. 2.

Fig. 4 is an end view of Fig. 2.

Fig. 5 is a plan of the trunnion pin alone.

Fig. 6 is an elevation of same.

Fig. 7 is an end view of same.

Fig. 8 is an elevation of the device complete.

Fig. 9 is a side view of Fig. 8.

A is the plate of sheet metal, B is the longitudinal slot cut therein, and C C are holes for the securing bolt. Figs. 2 and 3 show such a plate in its bent or folded condition with the trunnion or swivel pin D in position.

Referring to Figs. 5, 6 and 7, E is the shoulder or projection on the swivel or trunnion pin D, the ends of which F F are drilled out in order to reduce the weight of the pin. The hole G through the pin D is screwed or threaded to receive the end of the cable or wire.

Referring to Figs. 8 and 9, H is the wire or cable provided with a threaded end I which is screwed into the tapped hole in the trunnion pin D. The lock nut J may be provided to lock the wire in position and prevent it from turning. The wire H as shown is of streamline section.

The device is anchored to the machine by means of the bolt K fitted in a hole in the plate L, which plate may be secured as may be desired to the woodwork or any other portion of the machine, such woodwork or portion of the frame is indicated at M.

What I do claim as my invention and desire to secure by Letters Patent is:—

1. A device for the attachment of cables, wires, or the like upon air craft, comprising a trunnion pin, a carrier for the trunnion pin provided with means for permitting angular movement of the trunnion pin therein, and means for securing a cable, wire or the like to the trunnion pin.

2. A device for the attachment of cables, wires or the like upon air craft including a trunnion pin, a carrier for the trunnion pin provided with means for permitting angular movement of the trunnion pin therein, said carrier being formed from a sheet metal plate bent upon itself to provide a doubled plate with a tubular bearing at one end thereof, the plate being provided with an elongated slot at the tubular bearing, said trunnion fitting within the tubular bearing and having a portion intermediate its ends in alinement with the slot of the carrier for connection with a cable, wire or the like.

3. A device for the attachment of cables, wires and the like upon aircraft comprising a trunnion pin having a screw threaded opening therein, a sheet metal carrier for the trunnion pin provided with means for permitting angular movement of the trunnion pin therein, a threaded end upon the wire or cable adapted to engage the screw threaded opening in the trunnion pin and means for securing the sheet metal carrier to the frame or the like of the aircraft.

4. A device for the attachment of cables, wires or the like upon air craft including a trunnion having a laterally projecting portion intermediate its ends, a carrier for the trunnion provided with means for permitting angular movement of the trunnion therein, said carrier comprising a plate having a slotted tubular bearing at one end thereof, said trunnion fitting within the tubular bearing portion with the laterally projecting portion thereof slidably engaging the slot therein, said trunnion pin having a threaded bore extending transversely through the same and through the laterally projecting portion thereof in alinement with the slot in the bearing to receive the threaded end of a cable, wire or the like, substantially as described.

T. SOPWITH.

Copies of this patent may be obtained for five cents each, by addressing the "Commissioner of Patents, Washington, D. C."